G. D. SAILER.
GLASS BAKING DISH.
APPLICATION FILED NOV. 8, 1920.

1,413,063.

Patented Apr. 18, 1922.

INVENTOR
George D. Sailer

UNITED STATES PATENT OFFICE.

GEORGE D. SAILER, OF JEANNETTE, PENNSYLVANIA, ASSIGNOR TO McKEE GLASS COMPANY, OF JEANNETTE, PENNSYLVANIA, A CORPORATION OF PENNSYLVANIA.

GLASS BAKING DISH.

1,413,063.     Specification of Letters Patent.     Patented Apr. 18, 1922.

Application filed November 8, 1920. Serial No. 422,574.

*To all whom it may concern:*

Be it known that I, GEORGE D. SAILER, a citizen of the United States, and resident of Jeannette, in the county of Westmoreland and State of Pennsylvania, have invented a new and useful Improvement in Glass Baking Dishes; and I do hereby declare the following to be a full, clear, and exact description thereof.

My invention relates to glass baking-dishes.

Glass baking-dishes are coming largely into use owing to recent developments in the manufacture of a glass of low expansion and relatively high stability, such glass baking-dishes being set forth and claimed in Letters Patent of the United States No. 1,304,622, granted May 27, 1919 to E. C. Sullivan and W. C. Taylor.

The object of my invention is to improve the construction of such glass baking-dishes in certain respects looking toward greater efficiency in baking, thereby obtaining better results in a shorter time and with less heat.

Figure 1:
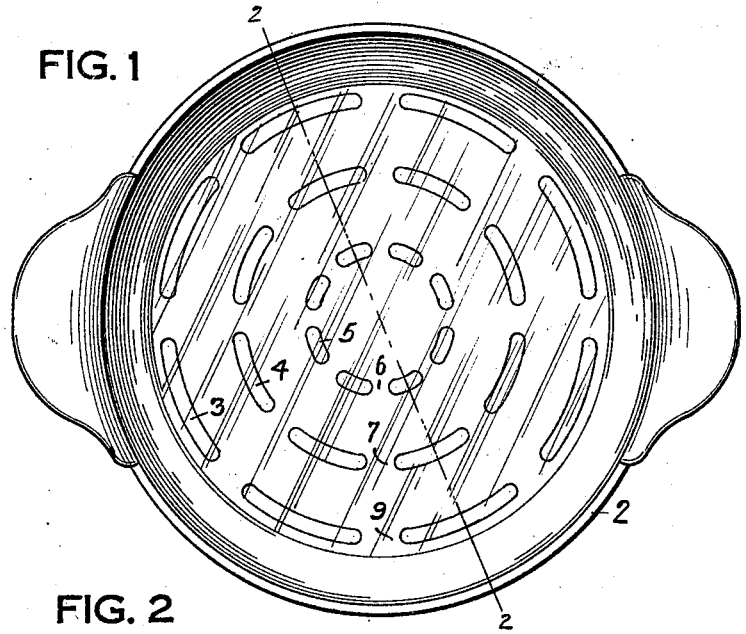
Figure 2:
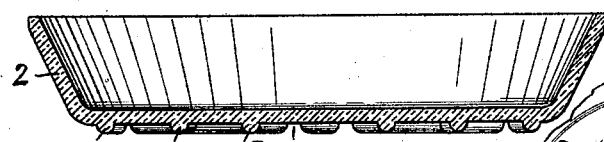
Figure 3:
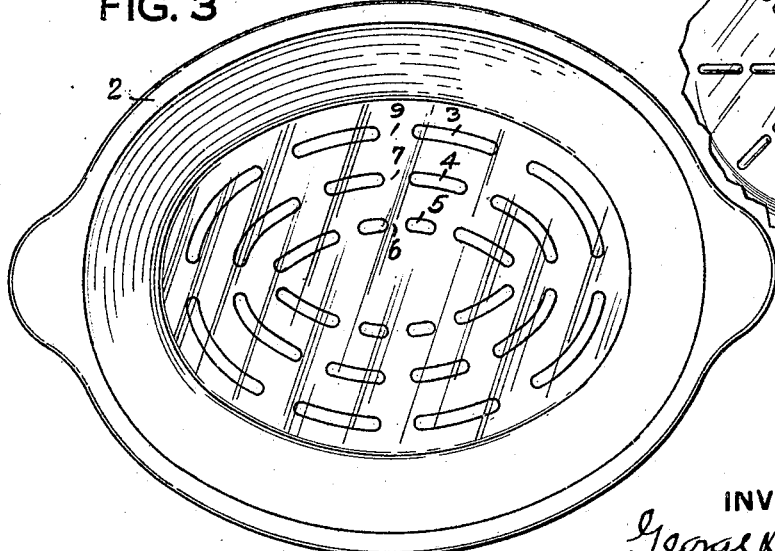
Figure 4:
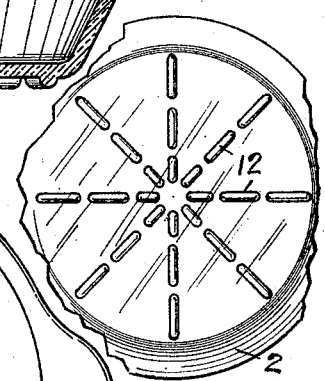

In the accompanying drawing, Fig. 1 is a plan view of a dish embodying my invention; Fig. 2 is a section on the line 2—2, Fig. 1; and Figs. 3 and 4 show modified forms of my invention.

In the drawing the numeral 2 designates a baking-dish made of glass of low expansion and relatively high stability. On the bottom face of the dish 2 are formed rows of broken or interrupted beading or raised portions 3, 4 and 5, preferably, where the dish is circular arranged concentrically with reference to each other.

The innermost row of beading 5 is made up of comparatively small units, separated by the spaces 6.

The next row of beading 4 has longer units than the beading 5 and is arranged concentrically with reference to said beading 5, the spaces 7 between said beading 4 registering with the spaces 6 of the beading 5.

At the outer edge of the bottom surface of the dish is the beading 3 which is made up of units still longer than the beading 4, and arranged concentrically with reference to said beading 4, with spaces 9 separating the units of said beading and coinciding with the spaces 6 and 7.

The dish, when in use, rests upon the rows of beading 3, 4 and 5, and such beading permits the free circulation of heat evenly to all parts of the bottom of the dish, and there is an opportunity for the admixture of atmospheric air with the heated air, creating a constant circulation. Furthermore, the spaces between the several rows of beading permits of the proper circulation, while at the same time the direct contact of the beading with the heat of the oven conducts the heat into the baking-dish, giving a greater baking efficiency than where the dish is only in contact with the hot oven at the outer rim of its bottom face. By having the units of the different rows of the beading increasing in length from the center outwardly this effect is increased.

Again the beading tends to strengthen the bottom of the dish, and in fact the whole structure so that it has greater wearing qualities when subjected to the rough treatment which such dishes receive in handling and washing.

In Fig. 3 I have illustrated a modified form of my invention in which the beading is employed on an oval dish, the same arrangement being followed except that the rows of beading are not arranged accurately concentrical with reference to each other.

In Fig. 4 I have illustrated a second modified form of my invention in which the beading 12 is not arranged in concentric rows but extends radially.

What I claim is:

1. A glass baking-dish having a plurality of rows of beading on its exterior bottom face, said rows being arranged in rings with spaces between the units of each row, the units in the several rows varying progressively in size and the spaces of the several rows registering with each other.

2. A glass baking-dish having a plurality of rows of beading on its exterior bottom face arranged in rings, spaces being left between the units of each row, the said spaces of each row registering with each other, and the units increasing in size from the inmost row to the outermost.

3. A glass baking-dish having a plurality of endless rows of projections on its exterior bottom face, the said rows being arranged one within another.

4. A glass baking-dish having a plurality of rows of projections on its exterior bottom face, the said rows being arranged in endless rings and being composed of units of different sizes.

In testimony whereof, I, the said GEORGE D. SAILER, have hereunto set my hand.

GEORGE D. SAILER.

Witnesses:
DONALD M. SMITH,
D. B. PILKEY.